US006944791B2

United States Patent
Humlicek et al.

(10) Patent No.: US 6,944,791 B2
(45) Date of Patent: Sep. 13, 2005

(54) METHOD OF HANDLING UNREADABLE BLOCKS DURING WRITE OF A RAID DEVICE

(75) Inventors: Donald R. Humlicek, Wichita, KS (US); Charles E. Nichols, Wichita, KS (US); David Ulrich, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 482 days.

(21) Appl. No.: 10/200,470

(22) Filed: Jul. 18, 2002

(65) Prior Publication Data

US 2004/0015657 A1 Jan. 22, 2004

(51) Int. Cl.⁷ .............................................. G06F 11/00
(52) U.S. Cl. ........................................................ 714/6
(58) Field of Search ............................. 714/6, 770, 764; 711/114; 719/325

(56) References Cited

U.S. PATENT DOCUMENTS

| 5,504,858 | A | * | 4/1996 | Ellis et al. ........................ 714/6 |
| 5,574,855 | A | * | 11/1996 | Rosich et al. .................. 714/41 |
| 5,581,690 | A | * | 12/1996 | Ellis et al. ........................ 714/6 |
| 5,826,001 | A | | 10/1998 | Lubbers et al. |
| 5,913,927 | A | | 6/1999 | Nagaraj et al. |
| 5,933,582 | A | | 8/1999 | Yamada |
| 5,933,592 | A | | 8/1999 | Lubbers et al. |
| 6,161,192 | A | | 12/2000 | Lubbers et al. |
| 6,349,359 | B1 | * | 2/2002 | Gittins et al. ................ 711/114 |
| 6,629,273 | B1 | * | 9/2003 | Patterson .................... 714/718 |
| 6,665,773 | B1 | | 12/2003 | McCombs |
| 2001/0000800 | A1 | | 5/2001 | Mori |
| 2001/0008008 | A1 | | 7/2001 | Mori |
| 2002/0007327 | A1 | | 1/2002 | Sasamoto et al. |
| 2002/0073279 | A1 | | 6/2002 | Sasamoto et al. |
| 2004/0015657 | A1 | | 1/2004 | Humlicek et al. |

* cited by examiner

Primary Examiner—Scott Baderman
Assistant Examiner—Paul F. Contino
(74) Attorney, Agent, or Firm—Cochran, Freund & Young LLC

(57) ABSTRACT

Disclosed is a method for continuing a write operation in a RAID device when parity cannot be generated. In cases where a read error or plurality of read errors prohibits the proper calculation of parity for a block of data, the parity block may be written as a bad block of data for subsequent read operations. The parity block may be forced to be a bad block of data by writing a recognizable pattern of data with a known bad error correction code or other method of forcing a read error to occur on an otherwise good block of a disk storage device. This method allows the write operation to continue without halting the system as with conventional RAID devices.

12 Claims, 15 Drawing Sheets

METHOD OF HANDLING UNREADABLE BLOCKS DURING WRITE OF A RAID DEVICE

BACKGROUND OF THE INVENTION a. Field of the Invention

The present invention pertains generally to redundant arrays of independent disks (RAID) and specifically to handling unreadable blocks during a write operation on RAID devices.

b. Description of the Background

Redundant arrays of independent disks (RAID) is standardized technology for the storage of data with emphasis on performance, fault tolerance, and the ability to recover data due to a failure of a disk drive. Many RAID products are commercially available.

The RAID Advisory Board of St. Peter, Minnesota has defined and standardized several different RAID levels. RAID level 1 ('RAID 1'), for example, is a mirrored disk wherein a complete copy of the data on one disk is simultaneously maintained and stored on a second disk. In the event of a failure of one disk, a complete copy of the data on the second disk is available. The data on the second disk may be used to recreate the data on the first disk when the first disk is replaced or repaired. RAID 5 uses several disks to store data. The data is stored in stripes, meaning that for a large block of data, some will be written to the first drive, some to the second drive, and so forth. Several disks can write in parallel, thus increasing the data throughput by a multiple of the number of available disks. RAID 5 uses parity data, interleaved with other data, as a method to store redundancy information. Parity is computed by performing the exclusive OR (XOR) function to the data on each block of the stripe. Other RAID levels exist with different variations of performance and cost tradeoffs.

A RAID 5 system can tolerate one failure and is still be able to reconstruct data. When a media error on a disk drive or other abnormality causes a failure on one disk drive, the RAID controller may reconstruct the data from the remaining drives. In the event of two failures, however, the RAID controller may not be able to recreate the data and the I/O operation will fail because the maximum number of simultaneous failures has been exceeded.

It would therefore be advantageous to provide a method for continuing a write process when more than the maximum number of simultaneous failures has been exceeded.

SUMMARY OF THE INVENTION

The present invention overcomes the disadvantages and limitations of the prior art by providing a method of continuing a write operation when one or more errors prohibit the calculation of parity for a stripe of data. A parity block is created that will be treated as if the block of data were bad during subsequent read operations, even if the physical portion of the storage device is properly functioning. This may include writing to the storage device in a specific manner to force subsequent errors or to log the block of data as being bad.

The present invention may therefore comprise a method of writing to a RAID device when an error prohibits calculation of parity comprising: selecting at least one block of new data to write to a stripe; reading data from a plurality of blocks of old data in the stripe; detecting an error when reading one of the plurality of blocks of old data; determining that the error prohibits calculation of a parity block for the stripe; flagging at least the parity block as bad; and processing the parity block of data as a bad block during subsequent read operations of the parity block.

The present invention may further comprise a RAID system capable of handling writing to a RAID device when an error prohibits calculation of parity comprising: a plurality of storage disks; and a controller that is capable of storing data on the plurality of storage disks in accordance with a RAID standard, the controller being further capable of detecting an error during the read portion of a write operation such that the parity cannot be calculated, the controller being further capable of flagging the parity block as bad such that the parity block is treated as a bad block during subsequent read operations of the parity block.

The advantage of the present invention is that as long as the RAID system is not dead, write operations will succeed even when read errors prevent the calculation of new parity.

DETAILED DESCRIPTION OF THE INVENTION

Figure 1:
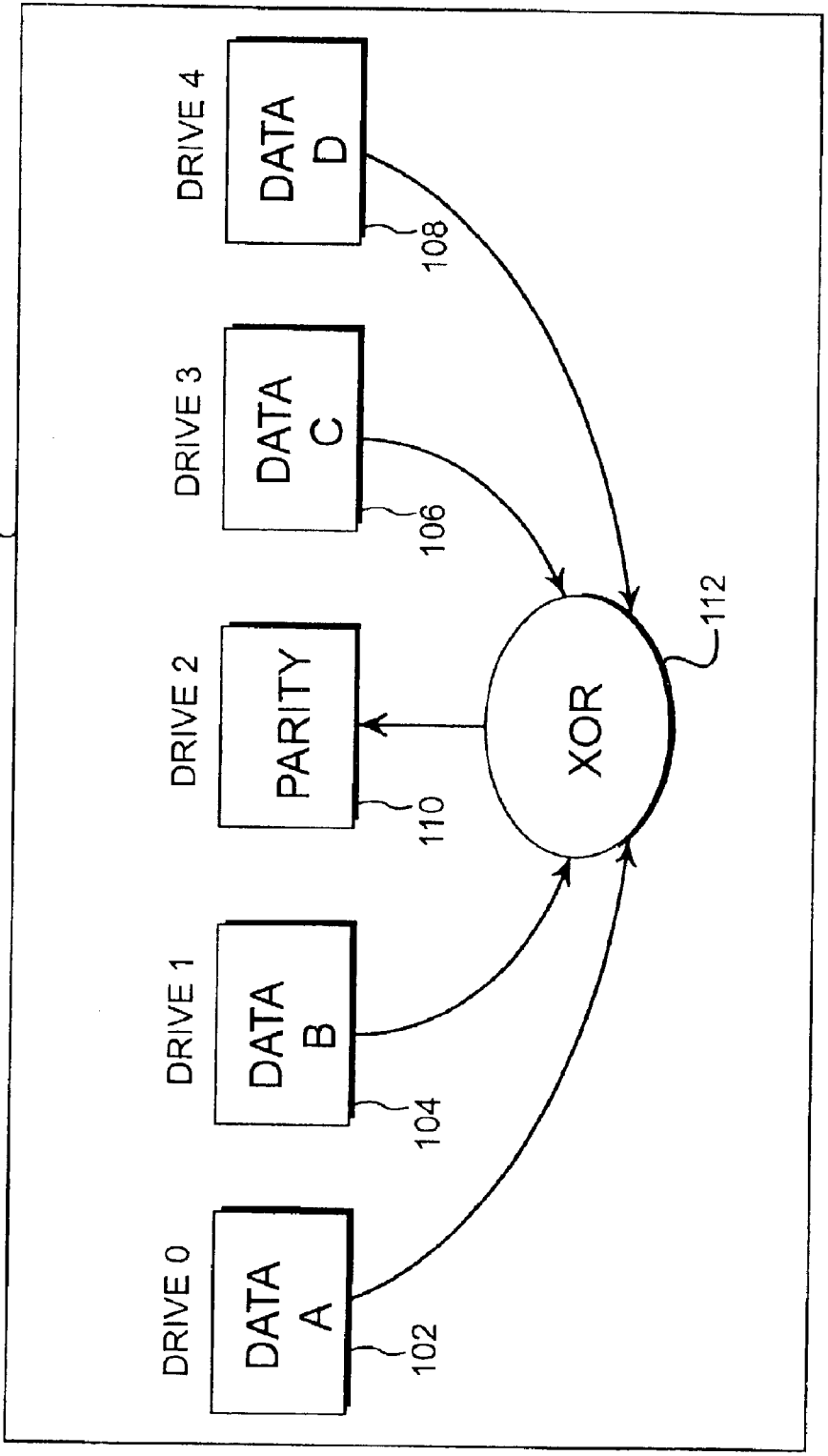
FIG. 1 is an illustration of the concept of creating parity in the RAID 5 standard.

FIG. 1 illustrates the concept of creating parity in the RAID 5 standard. The data blocks 102, 104, 106, and 108 are a single stripe. The data blocks are combined using the XOR function 112 to calculate the parity 110. In the present illustration, the parity 110 is stored on drive 2. Parity can be used to reconstruct data that is lost on any one drive.

Figure 2:
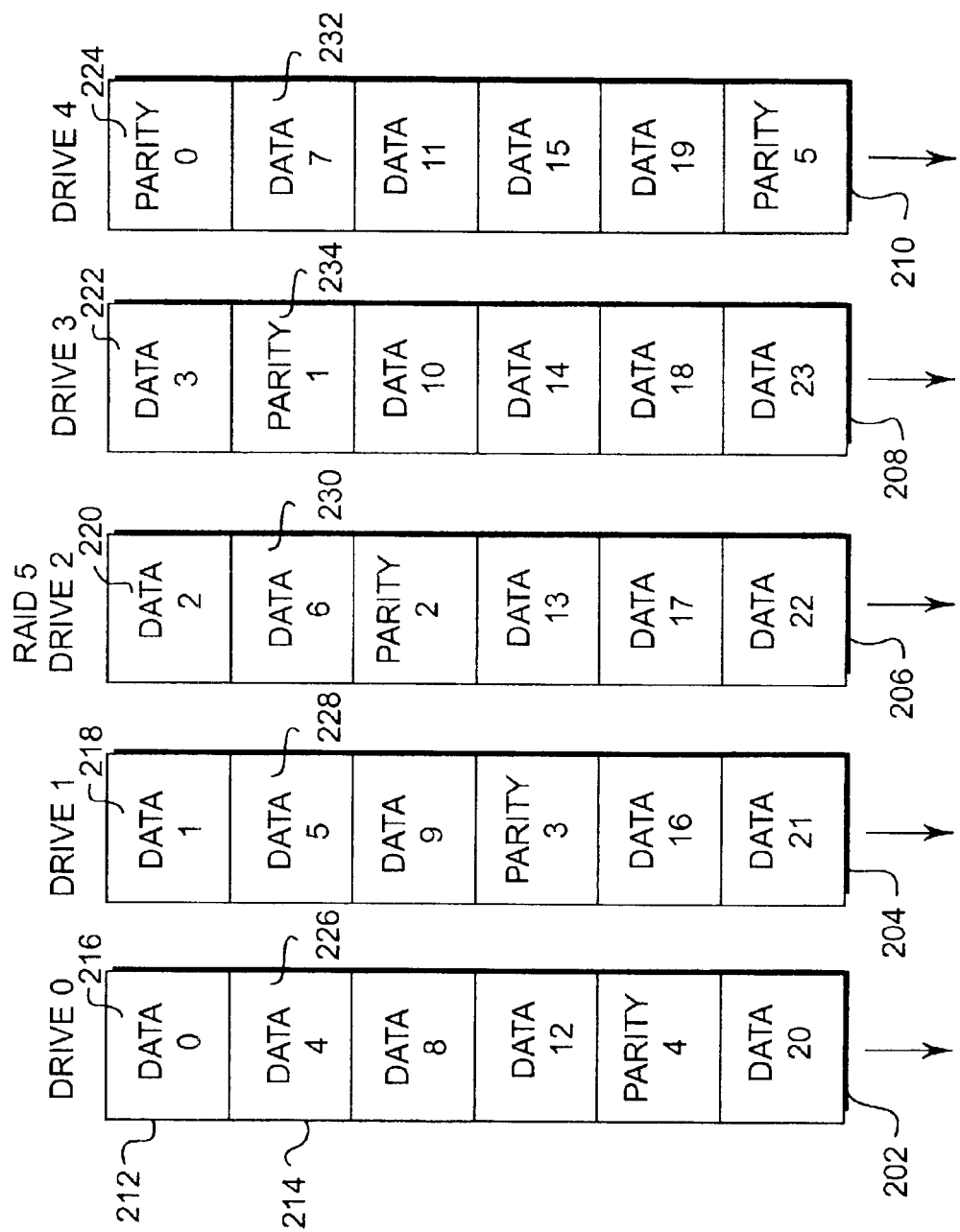
FIG. 2 is an illustration of the placement of data and parity across the various disk drives in the RAID 5 standard when there are five drives in the array.

FIG. 2 illustrates the placement of data and parity across the various disk drives in the RAID 5 standard when there are five drives in the array. The drives 202, 204, 206, 208, and 210 are shown in columns while the individual stripes are shown in rows such as 212 and 214. For the first stripe 212, the data 216, 218, 220, and 222 are written onto drives 0-3 and the parity 224 to drive 4. For the second stripe 214, the data 226, 228, 230, and 232 are written to drives 0, 1, 2, and 4 and the parity 234 to drive 3. In this manner, the parity is equally divided amongst all of the drives. In some RAID levels, a dedicated disk is allocated to storing the parity.

Figure 3:
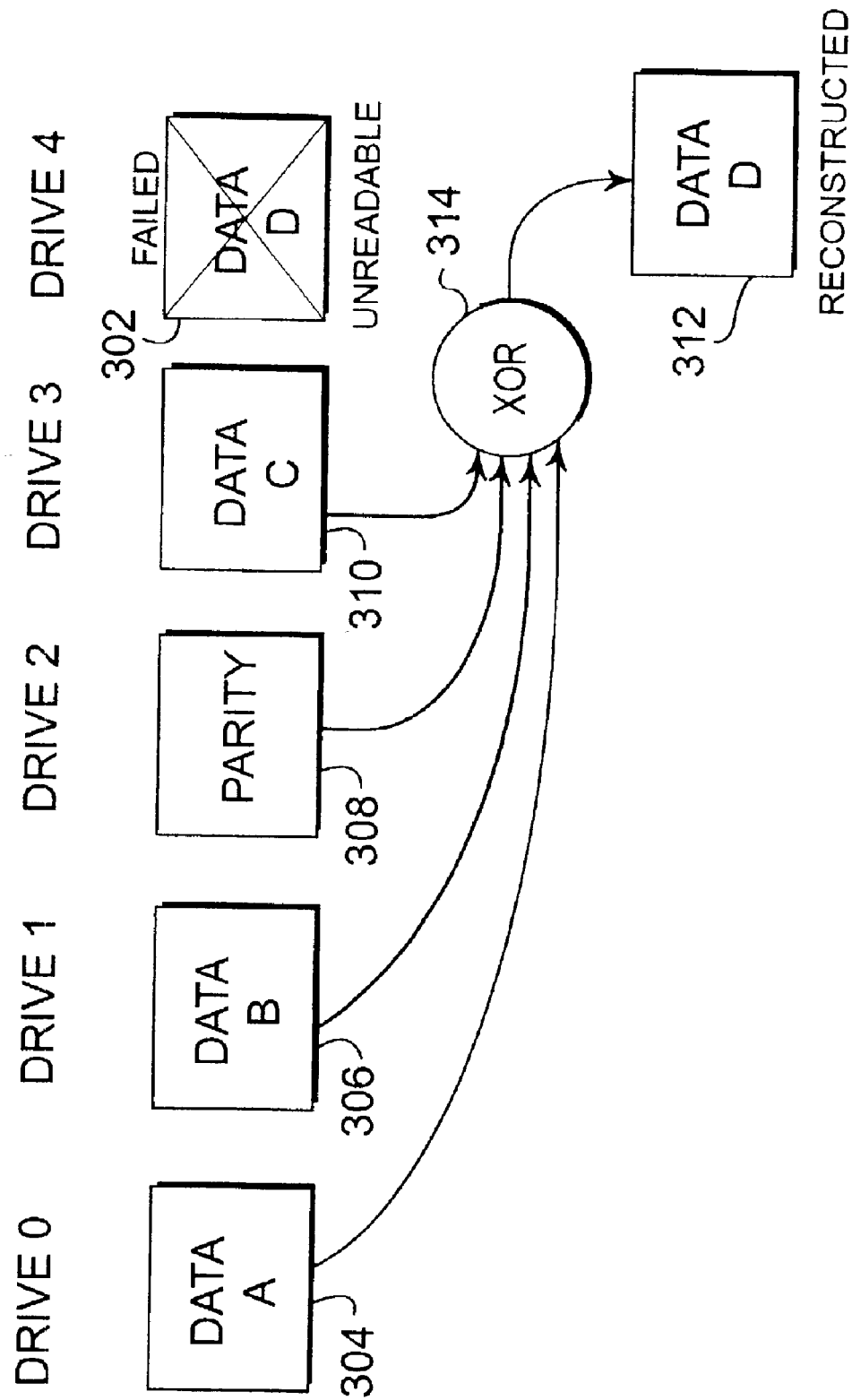
FIG. 3 is an illustration of how data can be reconstructed when one of the disk drives fails in a RAID 5 system.

FIG. 3 illustrates how data can be reconstructed when one of the disk drives fails in a RAID 5 system. In the present illustration, drive 4 has failed, leaving the data 302 unreadable. The data 312 can be reconstructed by combining the remaining data 304, 306, and 310 with the parity 308 using the XOR function 314.

If any one drive fails in a system, the data contained on the failed drive can be reconstructed. When the data from the failed drive is requested, the XOR function of the remaining data and parity on the stripe will be used to reconstruct the requested data. This can be done on the fly. When the system is operating in such a state, it is classified as a degraded state. The system can operate in a degraded state until another drive fails, at which time the system is dead. When two drives fail, the parity and the remaining data are not sufficient to reconstruct the missing data and the system halts.

When a block of data has a failure, from a catastrophic disk crash to a simple media read error, the system will reconstruct the missing data for the failed read using the XOR function. The reconstruction process is to take the data and parity from the other drives, reconstruct the data block using the XOR function, and use the reconstructed data in place of reading directly from the problem disk.

It is not unusual for a drive to have a read failure in a single block of data such as a media error. In a fully operational RAID 5 system, the failure of a single block of data would be reconstructed and the system would function as normal. However, if two or more read failures occur in a single stripe, then data cannot be reconstructed, the remaining blocks of data in the stripe are still valid data. The blocks of the failed drives may have data that are permanently lost.

A write to a single block of data that could not be read due to a media error will typically correct the error. When it does not correct the error the drive is treated as though it has failed.

Figure 4:
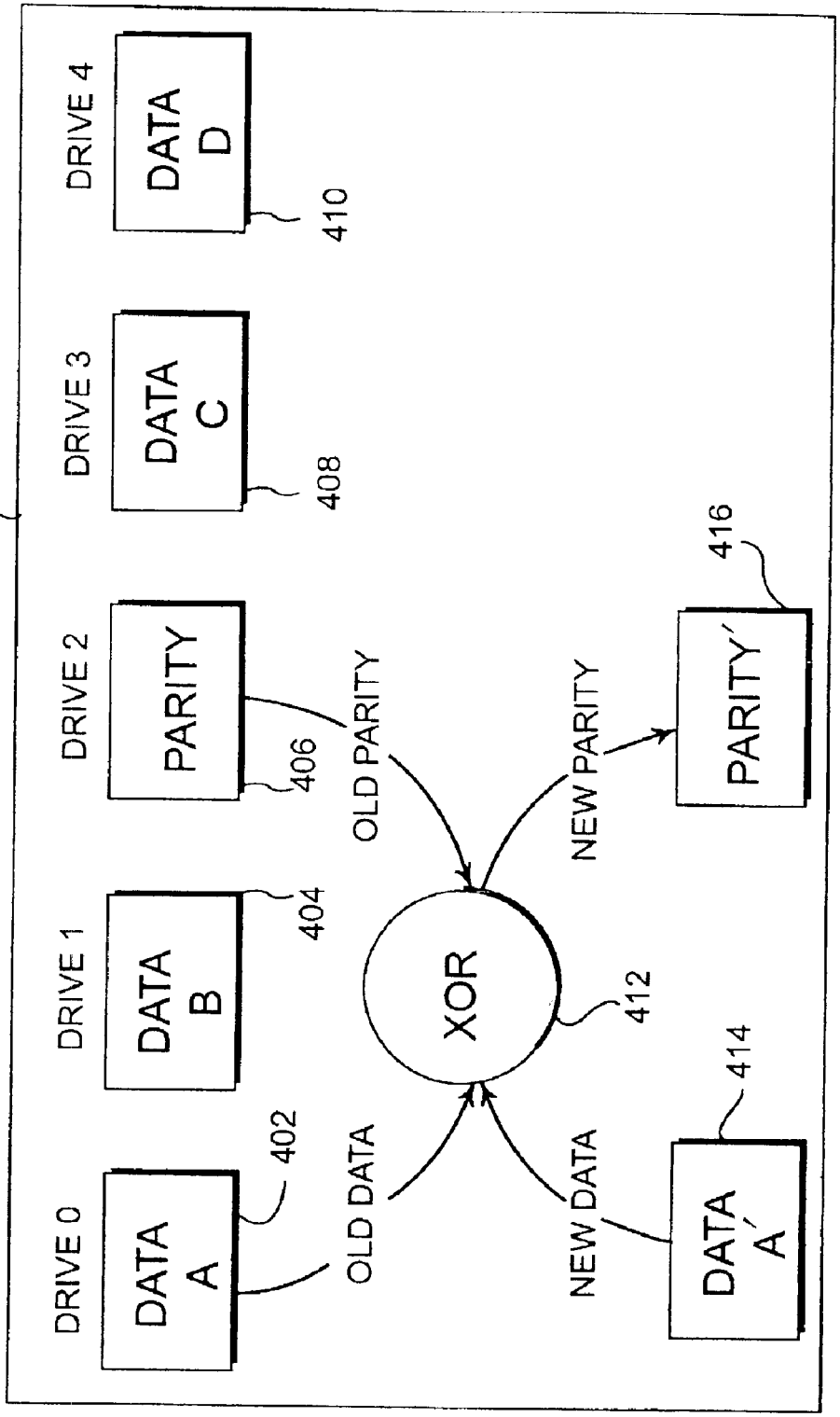
FIG. 4 is an illustration of a process of writing to one block of data in a stripe of a RAID 5 system.

FIG. 4 illustrates a first process 400 of writing to one block of data in a stripe of a RAID 5 system. The data blocks 402, 404, 408, and 410 contain old data that is stored as well as the parity block 406. In order to write a new block of data 414 to drive 0, the old data 402 from the drive and the parity 406 must be read and combined with the new data 414 with the XOR function 412 to calculate the new parity 416. The new data 414 is written to drive 0 and the new parity 416 is written to drive 2. This process illustrates that an operation to write one block actually requires two read operations and two write operations. The data in blocks 404, 408, and 410 are not read during this operation.

Figure 5:
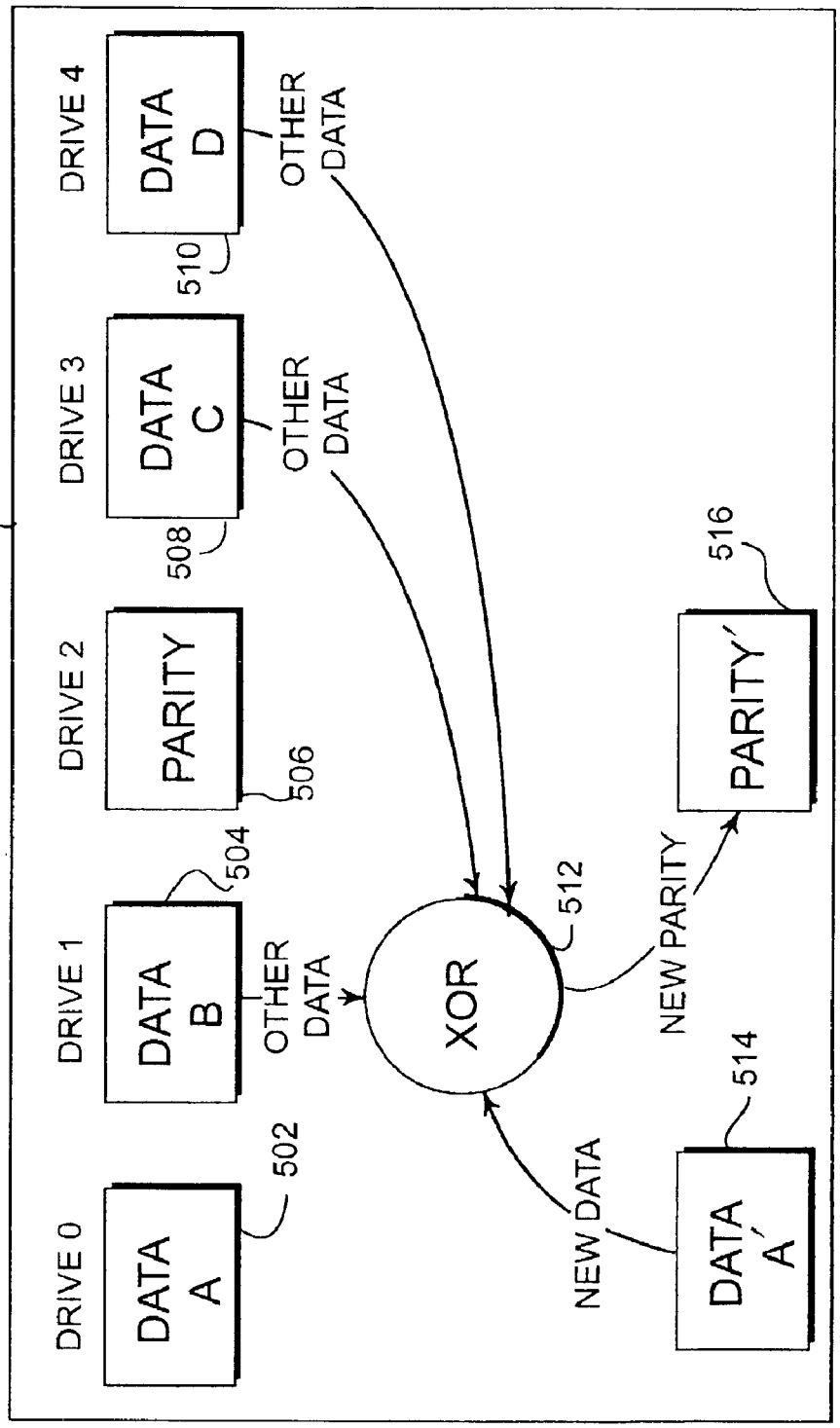
FIG. 5 is an illustration of a second process of writing to one block of data in a stripe of a RAID 5 system.

FIG. 5 illustrates a second process 500 of writing to one block of data in a stripe of a RAID 5 system. The data blocks 502, 504, 508, and 510 contain data that is stored as well as the parity block 506. In order to write a new block of data 514 to drive 0, the other data from the three other drives with data blocks, that is the data from blocks 504, 508, and 510, may be read and combined with the new data 514 to calculate a new parity 516. The process 500 illustrates the same write function as process 400, except that in process 400, data and parity are read from drives that will be written whereas in process 500, data is read from drives that will not be written.

Figure 6:
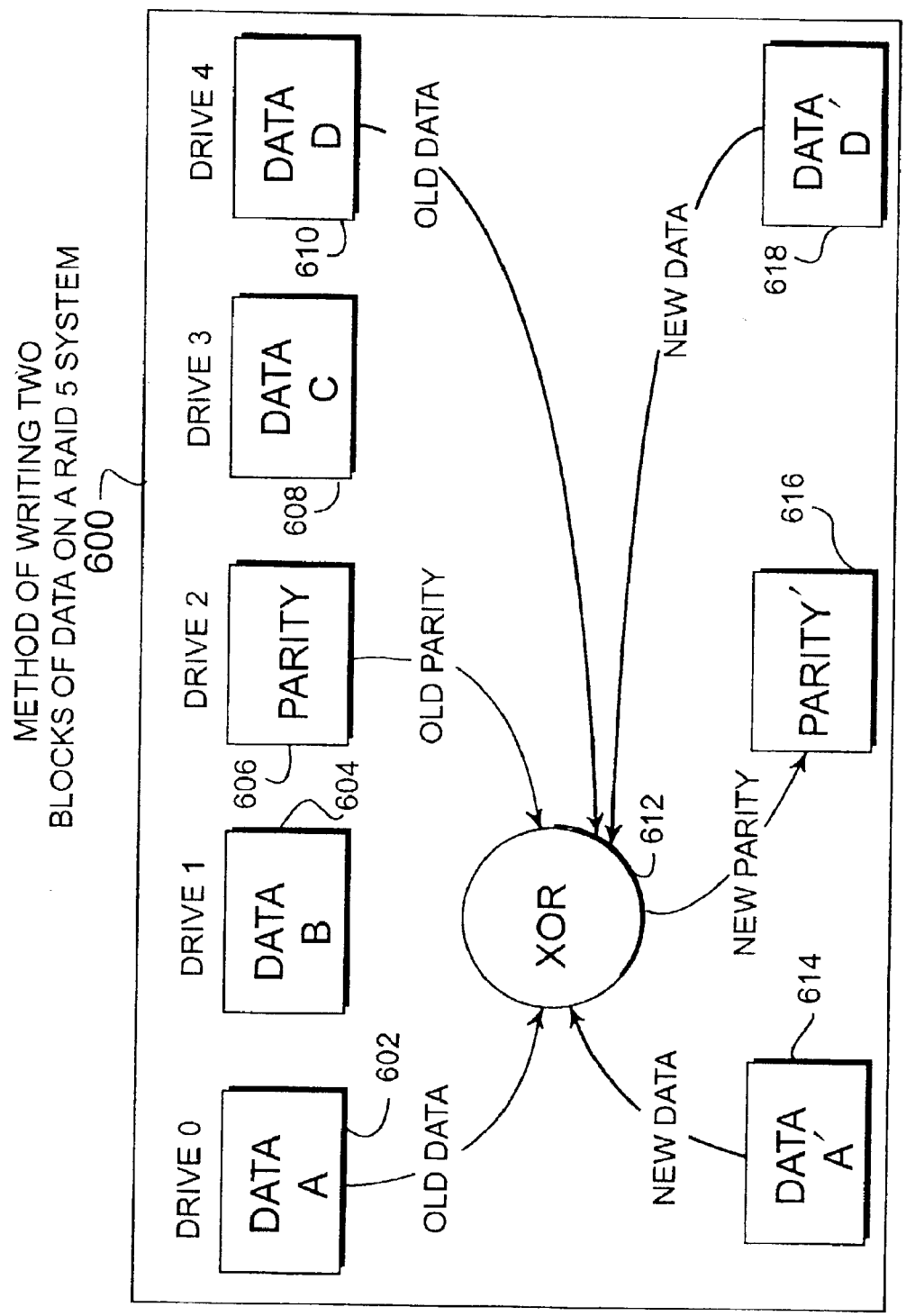
FIG. 6 is an illustration of a first process for writing to two blocks of data in a stripe of a RAID 5 system.

FIG. 6 illustrates a first process 600 for writing to two blocks of data in a stripe of a RAID 5 system. The data blocks 602, 604, 608, and 610 are old data blocks and block 606 is the parity block. New data blocks 614 and 618 can be combined with the corresponding old data blocks 602 and 610 and the old parity block 606 by the XOR function 612 to produce a new parity block 616. In the process 600, the data blocks 604 and 608 are not read.

Figure 7:
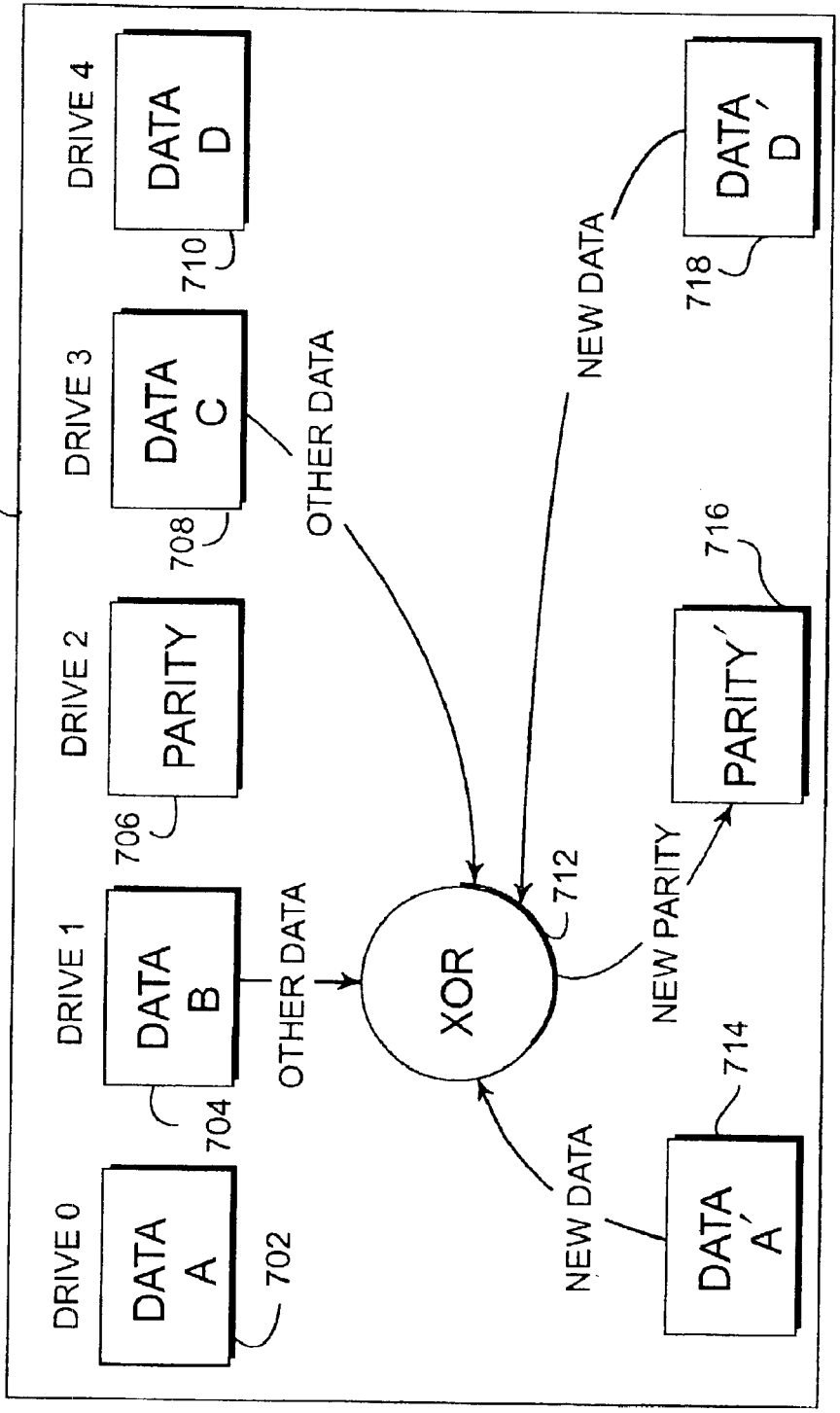
FIG. 7 is an illustration of a second process for writing to two blocks of data in a stripe of a RAID 5 system.

FIG. 7 illustrates a second process 700 for writing to two blocks of data in a stripe of a RAID 5 system. The other data blocks 702, 704, 708, and 710 are data blocks and block 706 is the parity block. The data blocks 714 and 718 are combined with the old data blocks 704 and 708 using the XOR function 712 to create a new parity block 716. The process 700 differs from the process 600 except that in process 600, data and parity are read from drives that will be written whereas in process 700 data is read from drives that will not be written.

Figure 8:
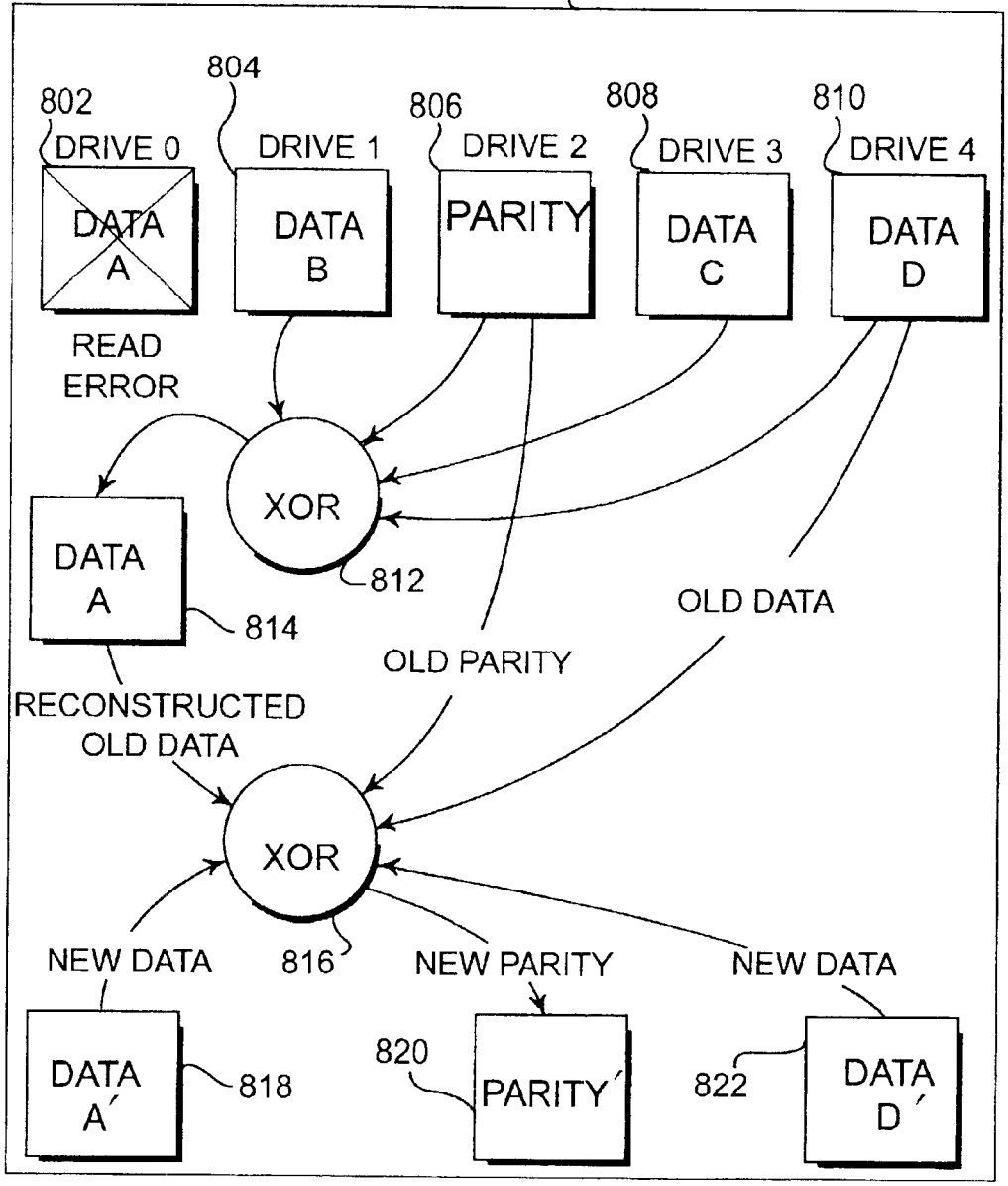
FIG. 8 is an illustration of a process for successfully writing two blocks of data on a RAID 5 system with a read error.

FIG. 8 illustrates a first process 800 for successfully writing two blocks of data on a RAID 5 system with a read error. The data blocks 802, 804, 808, and 810 contain data while block 806 contains the parity. Data block 802 contains a read error. Data blocks 818 and 822 represent new data that will replace data blocks 802 and 810, respectively. In order for the new parity to be calculated, the data blocks 804, 808, and 810 along with the parity 806 are combined with the XOR function 812 to create the reconstructed data 814. Reconstructed data 814, the old parity 806, and the old data 810 are then combined with the new data 818 and 822 to create the new parity 820. In this case, the read error in block 802 can be tolerated and a successful write operation can take place.

Figure 9:
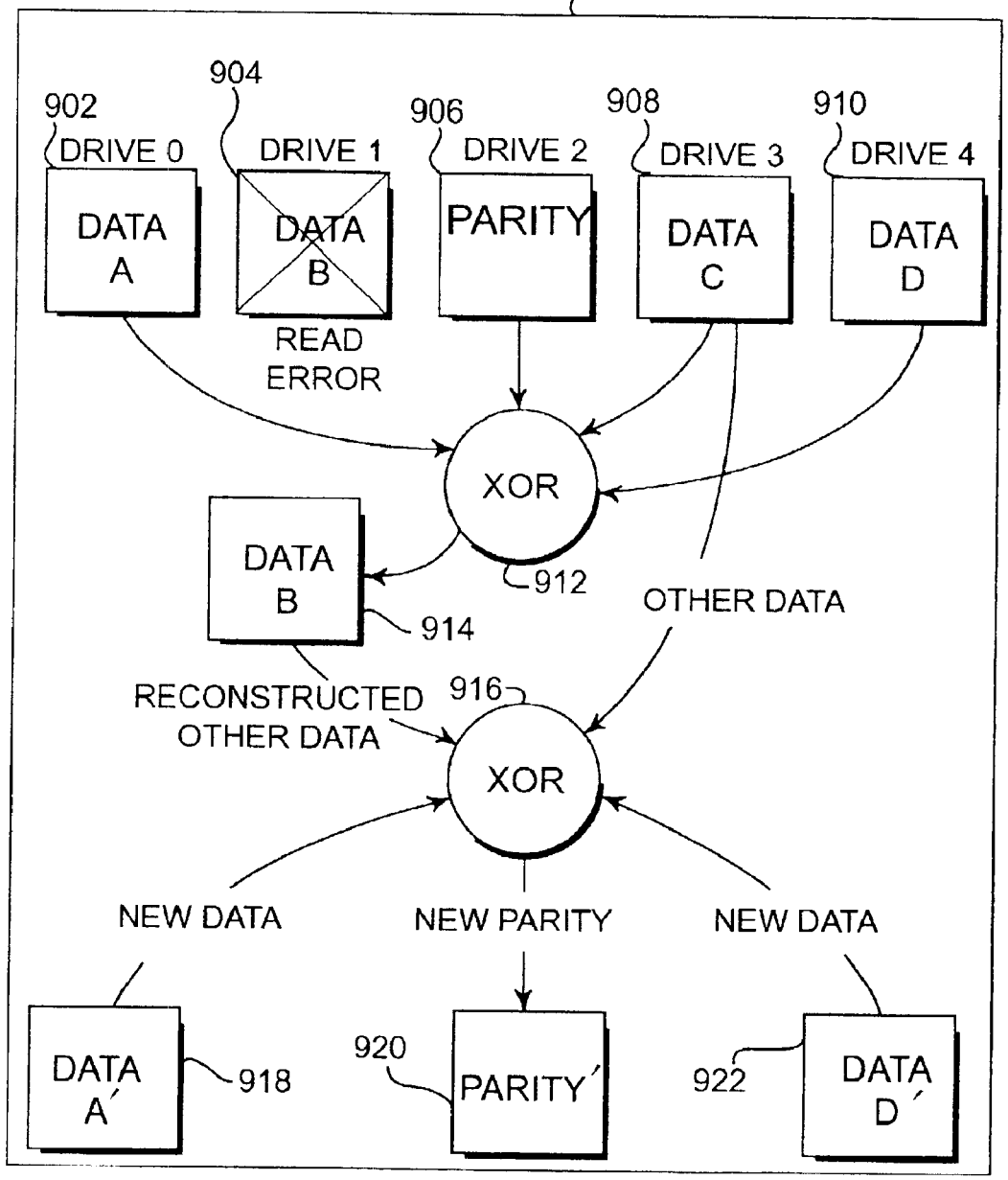
FIG. 9 is an illustration of a second process for successfully writing two blocks of data on a RAID 5 system with a read error.

FIG. 9 illustrates a second process 900 for successfully writing two blocks of data on a RAID 5 system with a read error. The process 900 does not directly use the old parity in the calculation of the new parity. The data blocks 902, 904, 908, and 910 represent the data along with old parity 906. Data block 904 represents a data block with a read error. In this case, the readable data blocks 902, 908, and 910 are combined with the parity 906 using the XOR function 912 to reconstruct data block 914. The reconstructed data 914, the old data 908, and the two new blocks of data 918 and 922 are combined with the XOR function 916 to produce the new parity 920. In this case, the read error in block 904 can be tolerated and a successful write operation can take place.

Figure 10:
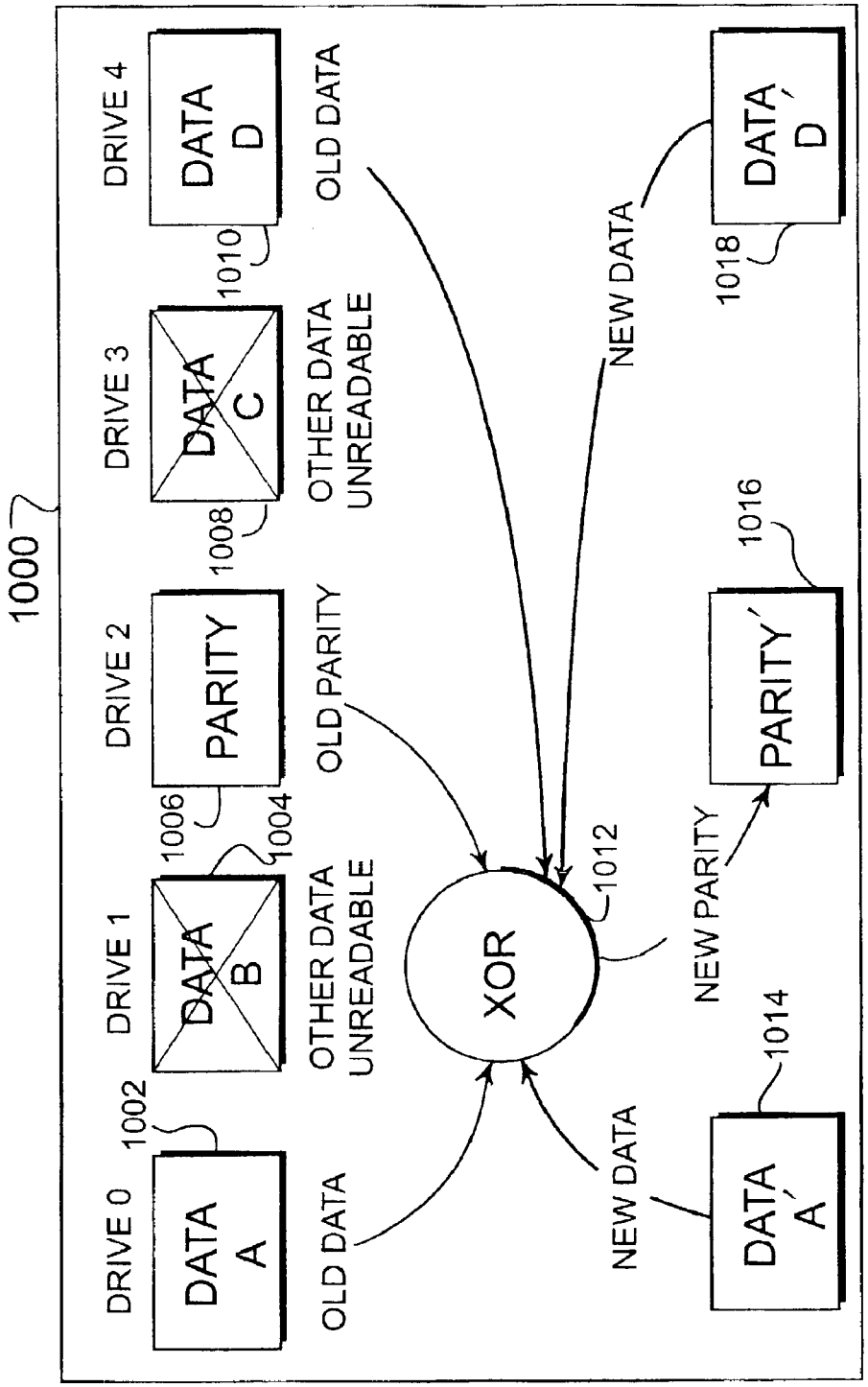
FIG. 10 is an illustration of a process for successfully writing two blocks of data on a RAID 5 system with two read errors in a single stripe.

FIG. 10 illustrates a process 1000 for successfully writing two blocks of data on a RAID 5 system with two read errors in a single stripe. The data blocks 1002, 1004, 1008, and 1010 represent the old data along with old parity 1006. The data blocks 1004 and 1008 contain read errors and are considered failed. The write operation of two new blocks 1014 and 1018 can still be successfully performed when the readable old data blocks 1002 and 1010 and old parity 1006 are combined with the new data blocks 1014 and 1018 using the XOR function 1012 to produce a new parity 1016. In this process, the new parity 1016 is valid even though two unreadable blocks are present in the data stripe.

Figure 11:
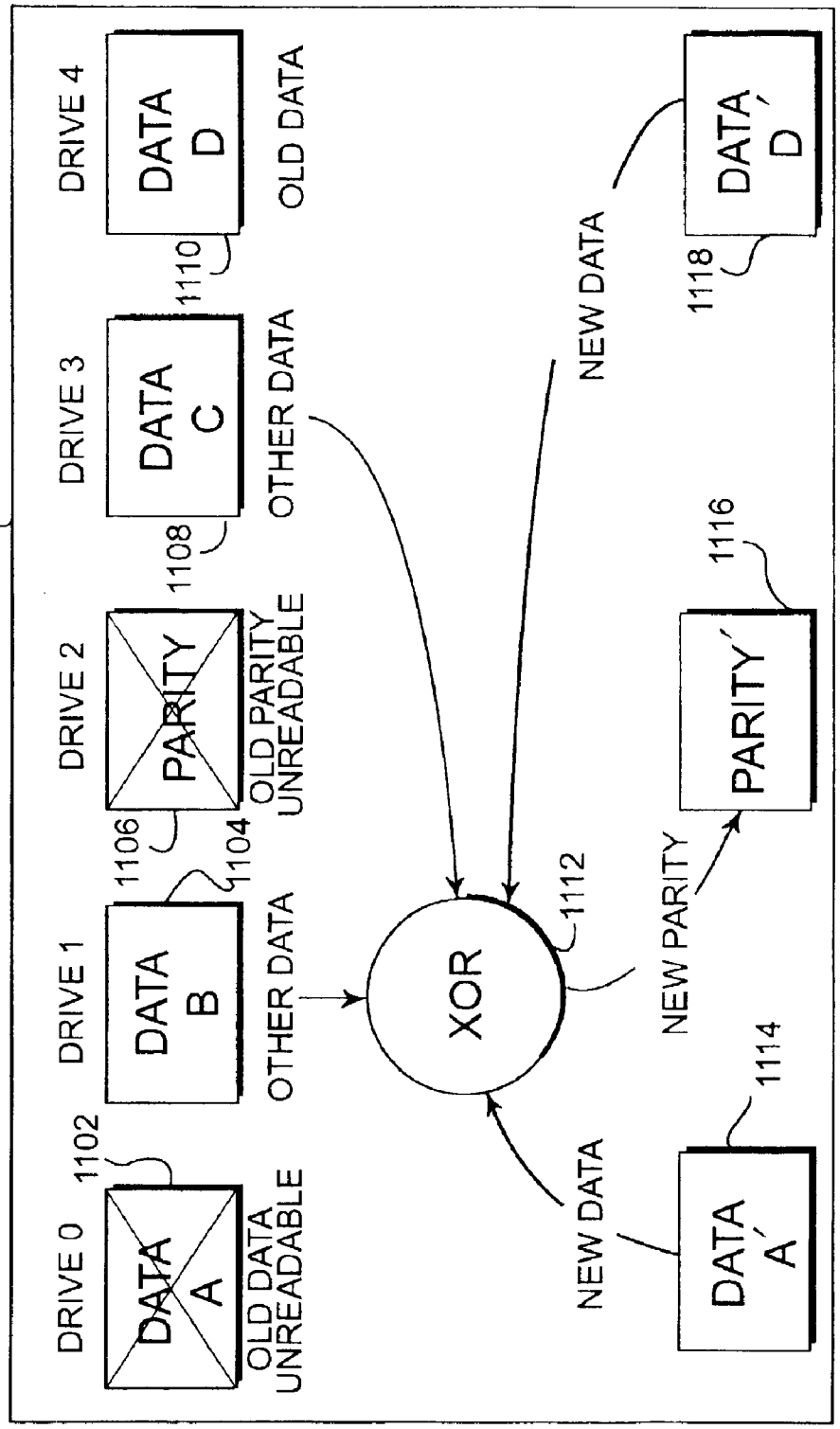
FIG. 11 is an illustration of a second process for successfully writing two blocks of data on a RAID 5 system with two read errors in a single stripe.

FIG. 11 illustrates a second process 1100 for successfully writing two blocks of data on a RAID 5 system with two read errors in a single stripe. The data blocks 1102, 1104, 1108, and 1110 represent the old data along with the old parity 1106. The data block 1102 and parity block 1106 contain read errors and are considered failed. The write operation of two new blocks 1114 and 1118 can still be successfully performed when the readable other data blocks 1104 and 1108 are combined with the new data blocks 1114 and 1118 with the XOR function 1112 to produce the new parity 1116.

Figure 12:
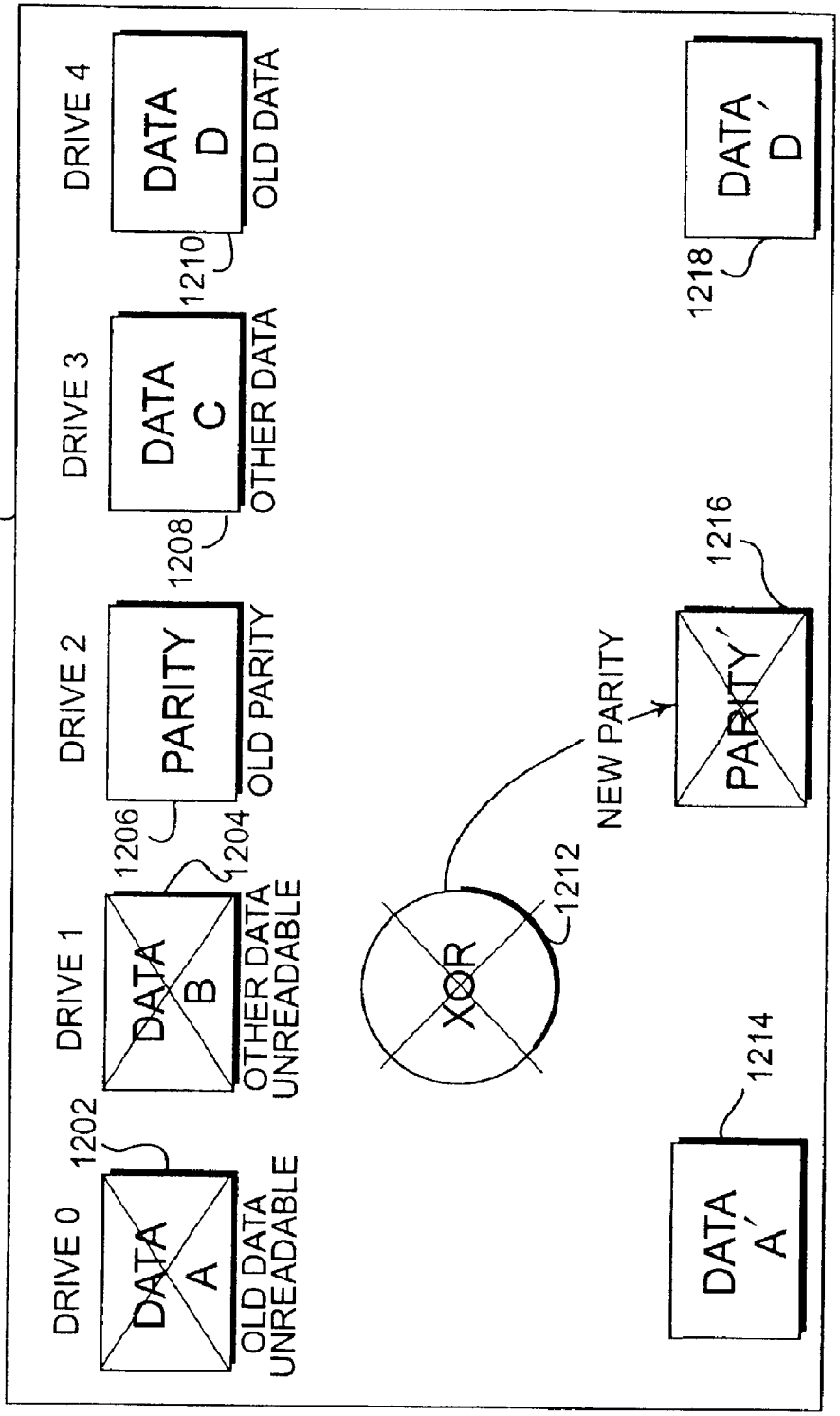
FIG. 12 is an illustration of a first state where two blocks of data cannot successfully be written to a stripe because of two unreadable blocks.

FIG. 12 illustrates a state 1200 where two blocks of data cannot successfully be written to a stripe because of two unreadable blocks. The data blocks 1202, 1204, 1208, and 1210 represent the old data along with the parity 1206. The data blocks 1202 and 1204 contain read errors and are considered failed. The write operation of blocks 1214 and 1218 cannot be performed in the present illustration. This is because there are no combinations of old data, parity, and new data using the XOR function 1212 that will allow the new parity 1216 to be created.

Figure 13:
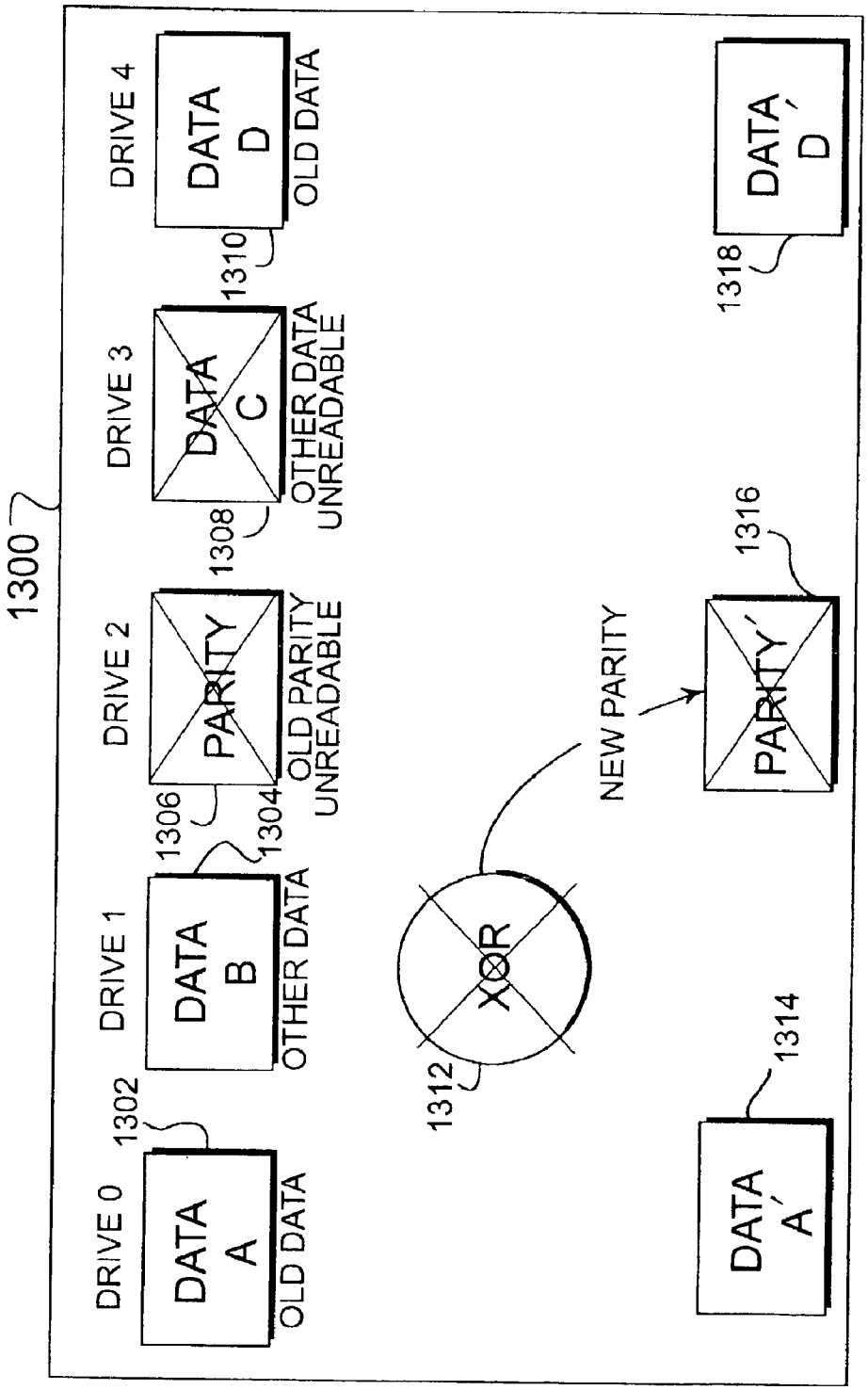
FIG. 13 is an illustration of a second state where two blocks of data cannot successfully be written to a stripe because of two unreadable blocks.

FIG. 13 illustrates a state 1300 where two blocks of data cannot successfully be written to a stripe because of two unreadable blocks. The data blocks 1302, 1304, 1308, and 1310 represent the old data along with the parity 1306. The data block 1308 and the parity block 1306 contain read errors and are considered failed. The write operation of blocks 1314 and 1318 cannot be performed in the present illustration. This is because there are no combinations of old data, parity, and new data using the XOR function 1312 that will allow the new parity 1316 to be created.

Figure 14:
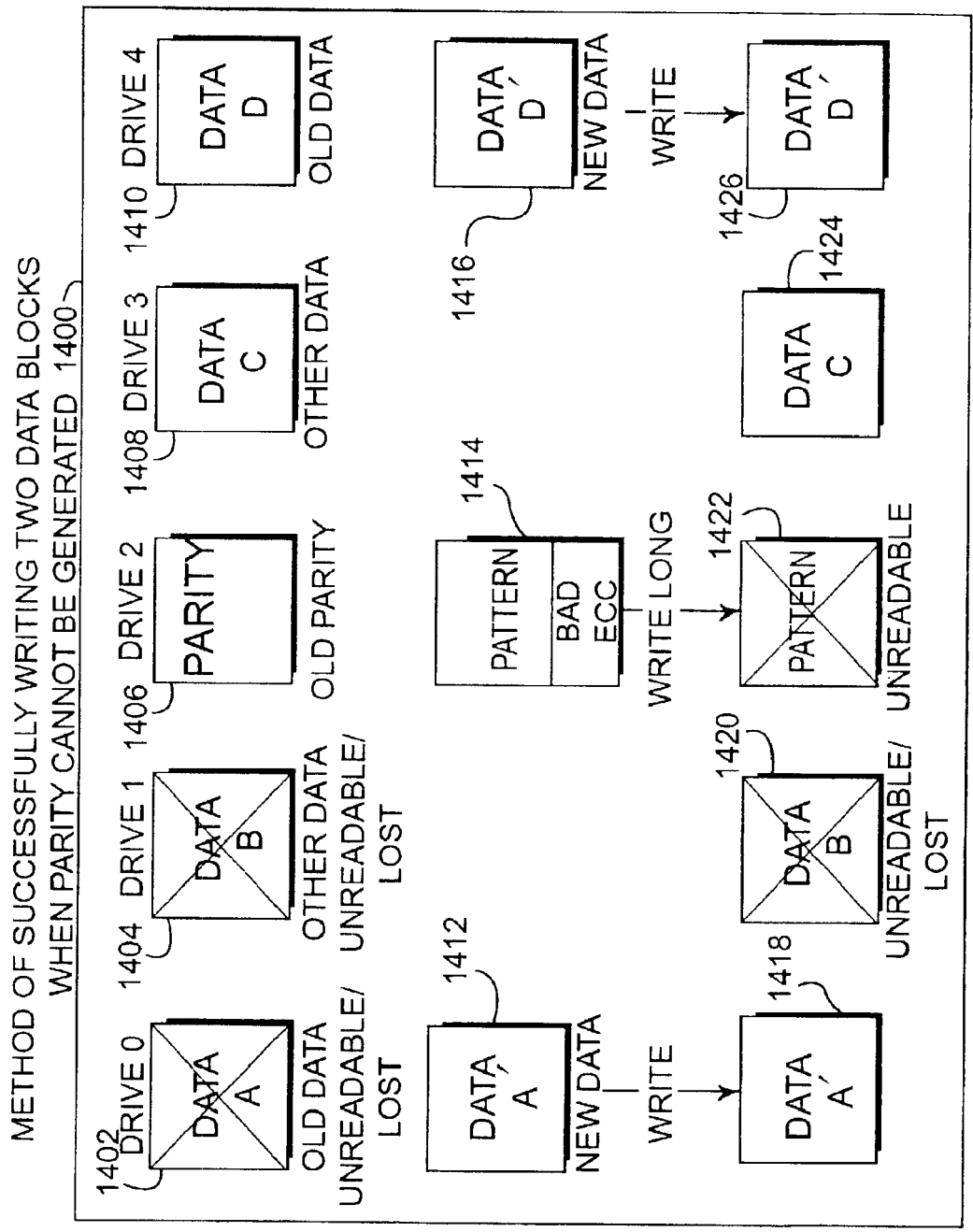
FIG. 14 is an illustration of an embodiment of the present invention where the state described in FIG. 12 can be successfully written.

FIG. 14 illustrates an embodiment 1400 of the present invention where the state 1200 can be successfully written. The embodiment 1400 intentionally creates an unreadable block in place of the parity. This method allows the write process to be completed successfully even though some data loss has occurred. Blocks 1402, 1404, 1408, and 1410 represent the data blocks of a stripe of a RAID 5 system. Block 1406 represents the parity block for the same stripe. Blocks 1402 and 1404 are unreadable blocks, such as might occur with a read error or other error.

Blocks 1412 and 1416 represent new data blocks that are going to be written to the stripe. In the present condition, the read failure of blocks 1402 and 1404 prohibit the calculation of a new parity. In typical RAID systems, this condition would cause the write operation to be failed. In the present embodiment of the present invention, the parity block 1414 is written as a recognizable pattern with a bad error correction code (ECC) such that the block 1422 could not be successfully read.

Blocks 1418, 1420, 1422, 1424, and 1426 represent the completed stripe as it is written to the respective disks. Block 1420 continues to be an unreadable block and is considered lost and unrecoverable, due to the simultaneous failure of blocks 1402 and 1404. The parity block 1422 behaves as if it were unreadable, due to the writing of a recognizable pattern with a bad error correction code. In addition, the data block 1418 may have corrected the unreadable block 1402.

Subsequent read and write operations to the present stripe will proceed according to standard RAID procedures. The data loss due to the unreadable blocks 1402 and 1404 results in the unreadable blocks 1420 and 1422. With the present embodiment, the process of the write operation can be completed successfully without returning a failure as in the prior art.

The parity block 1422 can be made unreadable by several methods. One method is to write a recognizable pattern as well as a known bad error correction code using a SCSI Write Long command. The result of this method is that during subsequent read operations, the pattern is read and an error correction code is calculated. When the calculated ECC is compared to the stored ECC for the block, a read failure will be generated since the calculated ECC will be different from the stored ECC. During standard write operations, the SCSI device may calculate an ECC and write the calculated ECC to the disk. The SCSI Write Long command bypasses the standard ECC calculation and allows both the data and ECC to be written directly.

Another method of marking the block 1422 as unreadable may be to keep a table of known bad blocks within the RAID system. Instead of writing block 1422 using a bad ECC, the block 1422 may be identified within the table of known bad blocks. During subsequent read operations, the table may be searched for the block 1422. If the block 1422 is found in the table, the block would be treated as if it were a failed read operation by the RAID controller. Other methods may include writing a recognizable pattern as well as a known bad cyclic redundancy code (CRC) or error detection code (EDC).

Figure 15:
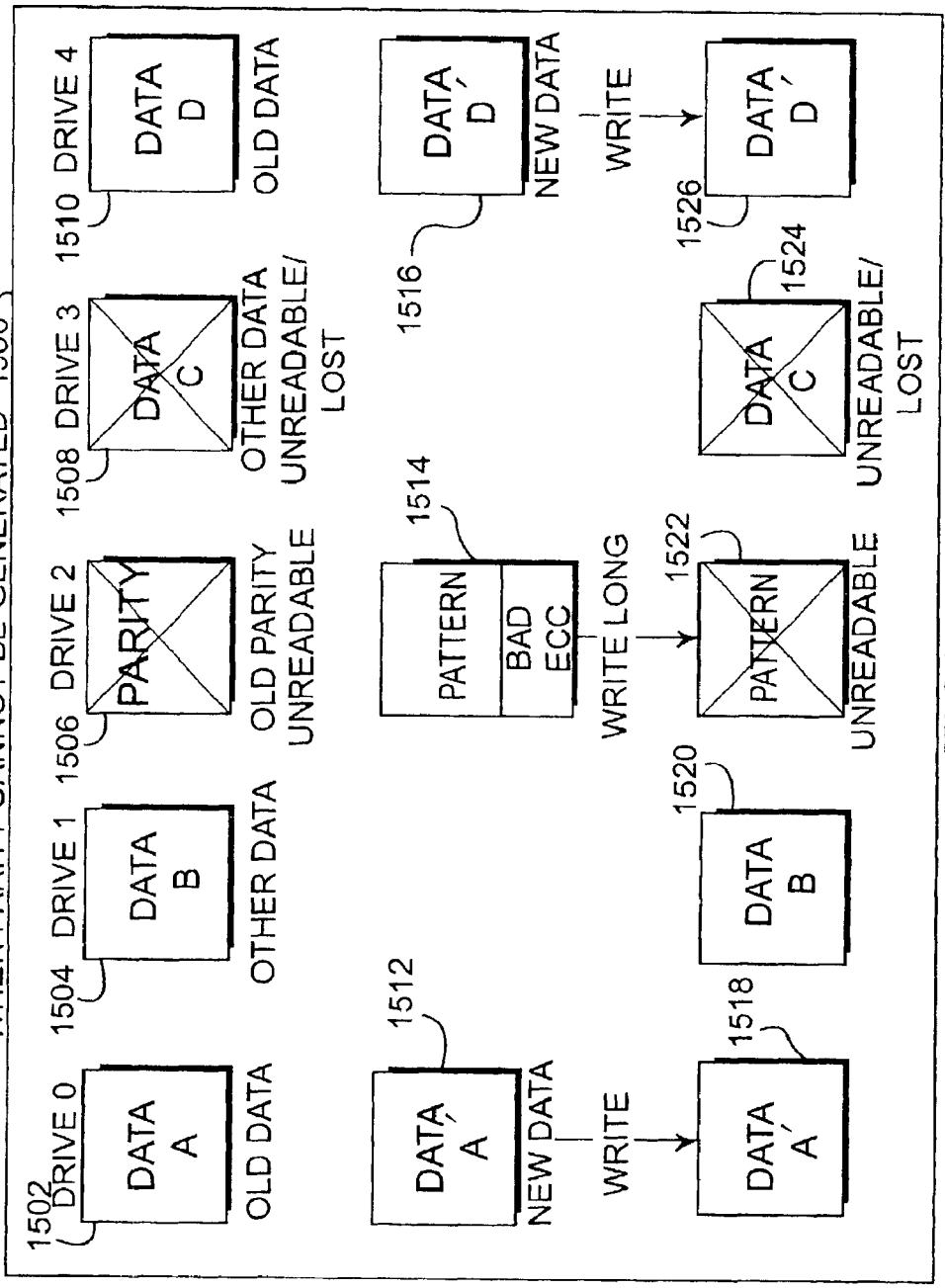
FIG. 15 is an illustration of an embodiment of the present invention where the state described in FIG. 13 can be successfully written.

FIG. 15 illustrates an embodiment 1500 of a method of successfully writing two data blocks when parity cannot be generated. Embodiment 1500 is similar to the embodiment 1400 described in FIG. 14 with the exception that the parity block is affected by an error, as is a second data block.

Blocks 1502, 1504, 1508, and 1510 represent the data contained on a stripe of a RAID system. Block 1506 represents the parity block of the stripe. The parity block 1506 and data block 1508 have errors that prevent data from being read from the blocks. For example, the blocks 1506 or 1508 may have a read error, a mechanical drive error, or any other abnormality that prevents data from being properly read from the drive.

Blocks 1512 and 1516 represent new data that is being overwritten on blocks 1502 and 1510, respectively. In the present embodiment of the present invention, the parity block 1514 is written as a recognizable pattern with a bad error correction code (ECC) such that the block 1522 could not be successfully read.

In the present condition, the read failure of blocks 1506 and 1508 prohibit the calculation of a new parity. In typical RAID systems, this condition would cause the write operation to be failed.

Blocks 1518, 1520, 1522, 1524, and 1526 represent the completed stripe as it is written to the respective disks. Block 1524 continues to be an unreadable block and is considered lost and unrecoverable, due to the simultaneous failure of data block 1508 and parity block 1506. The parity block 1522 behaves as if it were unreadable, due to the writing of a recognizable pattern with a bad error correction code.

Subsequent read and write operations to the present stripe will proceed according to standard RAID procedures. The data loss due to the unreadable data block 1508 and parity block 1506 results in the unreadable data block 1524 and parity block 1522. With the present embodiment, the process of the write operation can be completed successfully without returning a failure as in the prior art.

The parity block 1522 can be made unreadable by several methods, as discussed in FIG. 14. One method is to write a recognizable pattern as well as a known bad error correction code using a SCSI Write Long command. The result of this method is that during subsequent read operations, the pattern is read and an error correction code is calculated. When the calculated ECC is compared to the stored ECC for the block, a read failure will be generated since the calculated ECC will be different from the stored ECC. During standard write operations, the SCSI device may calculate an ECC and write the calculated ECC to the disk. The SCSI Write Long command bypasses the standard ECC calculation and allows both the data and ECC to be written directly.

Another method of marking the block 1522 as unreadable may be to keep a table of known bad blocks within the RAID system. Instead of writing block 1522 using a bad ECC, the block 1522 may be identified within the table of known bad blocks. During subsequent read operations, the table may be searched for the block 1522. If the block 1522 is found in the table, the block would be treated as if it were a failed read operation by the RAID controller. Other methods may include writing a recognizable pattern as well as a known bad cyclic redundancy code (CRC) or error detection code (EDC).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A RAID system capable of handling writing to a RAID device when an error prohibits calculation of parity comprising:
    a plurality of storage disks; and
    a controller that is capable of storing data on said plurality of storage disks in accordance with a RAID standard, said controller being further capable of:
    receiving a stripe of data that includes a plurality of data blocks and a parity block:
    detecting an error in a first block of data and a second block of data of said plurality of data blocks;
    detecting that said parity block is not bad;
    flagging said parity block as bad since said parity block cannot be used to regenerate said first block of data that contains an error and said second block of data that contains an error;
    replacing said first block of data that contains an error with first new data block;
    replacing a third block of data of said plurality of blocks of data that does not contain an error with a second new data block;
    writing said first new data block and said second new data block to said RAID storage device;
    writing at least one other block of data, that does not contain errors, to said RAID storage device;
    writing said parity block, that is flagged as bad, to said RAID storage device;
    writing said second block of data, that contains an error, to said RAID storage device; and
    preventing said parity block from regenerating said second block of data that contains an error, even though said second block of data is the only block of data that does contain an error, by detecting a flag in said parity block indicating that said parity block is bad.

2. The RAID system of claim 1 wherein said flagging of said parity block as bad comprises writing a pattern of data comprising a readable pattern of data and an invalid error correction code to said parity block.

3. The RAID system of claim 1 wherein said flagging of said parity block as bad comprises writing a pattern of data comprising a readable pattern of data and an invalid cyclic redundancy code to said parity block.

4. The RAID system of claim 1 wherein said flagging of said parity block as bad comprises writing a pattern of data comprising a readable pattern of data and an invalid error detection code to said parity block.

5. The RAID system of claim 1 wherein said flagging of said parity block as bad comprises adding said parity block to a table of known bad blocks of data, said table being referenced during read operations and said parity block being treated as invalid during subsequent read operations.

6. The RAID system of claim 1 wherein said error comprises a media error.

7. A method of writing to a RAID storage device when an error prohibits calculation of parity comprising:
    receiving a stripe of data that includes a plurality of data blocks and a parity block;
    detecting an error in a first block of data and a second block of data of said plurality of data blocks;
    detecting that said parity block is not bad;
    flagging said parity block as bad since said parity block cannot be used to regenerate said first block of data that contains an error and said second block of data that contains an error;
    replacing said first block of data that contains an error with a first new data block;
    replacing a third block of data of said plurality of blocks of data that does not contain an error with a second new data block;
    writing said first new data block and said second new data block to said RAID storage device;
    writing at least one other block of data, that does not contain errors, to said RAID storage device;
    writing said parity block, that is flagged as bad, to said RAID storage device;
    writing said second block of data, that contains an error, to said RAID storage device; and
    preventing said parity block from regenerating said second block of data that contains an error, even though said second block of data is the only block of data that does contain an error, by detecting a flag in said parity block indicating that said parity block is bad.

8. The method of claim 7 wherein said act of flagging of said parity block as bad comprises writing a pattern of data comprising a readable pattern of data and an invalid error correction code said parity block.

9. The method of claim 7 wherein said act of flagging of said parity block as bad comprises writing a pattern of data comprising a readable pattern of data and an invalid cyclic redundancy code to said parity block.

10. The method of claim 7 wherein said act of flagging of said parity block as bad comprises writing a pattern of data comprising a readable pattern of data and an invalid error detection code to said parity block.

11. The method of claim 7 wherein said act of flagging of said parity block as bad comprises adding said parity block to a table of known bad blocks of data, said table being referenced during read operation and said parity block being treated as invalid during subsequent read operations.

12. The method of claim 7 wherein said error comprises a media error.

* * * * *